(12) United States Patent
Braun et al.

(10) Patent No.: US 11,041,408 B2
(45) Date of Patent: Jun. 22, 2021

(54) TURBOCHARGER

(71) Applicant: MAN ENERGY SOLUTIONS SE, Augsburg (DE)

(72) Inventors: Steffen Braun, Augsburg (DE); Daniel Albrecht, Augsburg (DE); Harald Denkel, Baar (DE); Stefan Weihard, Augsburg (DE); Bernd Haas, Neusäß (DE); Johannes Niebuhr, Augsburg (DE); Urban Spatz, Neusäß (DE)

(73) Assignee: MAN Energy Solutions SE, Augsburg (DE)

( * ) Notice: Subject to any disclaimer, the term of this patent is extended or adjusted under 35 U.S.C. 154(b) by 52 days.

(21) Appl. No.: 16/365,265

(22) Filed: Mar. 26, 2019

(65) Prior Publication Data
US 2019/0301304 A1 Oct. 3, 2019

(30) Foreign Application Priority Data

Mar. 27, 2018 (DE) .......................... 102018107304.6

(51) Int. Cl.
*F01D 25/26* (2006.01)
*F01D 25/24* (2006.01)
(Continued)

(52) U.S. Cl.
CPC ........... *F01D 25/26* (2013.01); *F01D 25/243* (2013.01); *H02G 3/083* (2013.01); *F01D 9/026* (2013.01);
(Continued)

(58) Field of Classification Search
CPC ........ F01D 25/26; F01D 25/243; F01D 25/04; F01D 25/28; F01D 29/668; F01D 9/026;
(Continued)

(56) References Cited

U.S. PATENT DOCUMENTS 2,935,294 A * 5/1960 Angell ................. F01D 21/045
415/9
5,271,220 A * 12/1993 Holmes ..................... F23R 3/04
60/39.091

(Continued)

FOREIGN PATENT DOCUMENTS

EP          0834646 A1 *  4/1998   ............. F01D 9/026

OTHER PUBLICATIONS

EP-0834646—Translation (Year: 1998).*

*Primary Examiner* — Woody A Lee, Jr.
*Assistant Examiner* — Behnoush Haghighian
(74) *Attorney, Agent, or Firm* — Cozen O'Connor

(57) ABSTRACT

A turbocharger, with a turbine for expanding a first medium, a compressor for compressing a second medium utilising energy extracted in the turbine during expansion of the first medium. A turbine housing and a compressor housing are connected to a bearing housing. A casing radially and axially surrounds the turbine housing, the compressor housing, and/or the bearing housing at least in sections, which is connected to the respective housing via multiple fastening devices. At least some of the fastening devices extend through a wall of the casing into the housing include metallic damping elements made of wire on opposite sides of the wall of the casing through which the same extend.

12 Claims, 2 Drawing Sheets

(51) Int. Cl.
*H02G 3/08* (2006.01)
*F01D 25/04* (2006.01)
*F01D 9/02* (2006.01)
*F02C 6/12* (2006.01)
*F01D 21/04* (2006.01)

(52) U.S. Cl.
CPC ............ *F01D 21/045* (2013.01); *F01D 25/04* (2013.01); *F01D 25/24* (2013.01); *F02C 6/12* (2013.01); *F05D 2220/40* (2013.01); *F05D 2240/14* (2013.01)

(58) Field of Classification Search
CPC . F05D 2260/96; F05D 2220/40; F16B 5/0241
See application file for complete search history.

(56) References Cited

U.S. PATENT DOCUMENTS

| | | | | |
|---|---|---|---|---|
| 5,310,025 | A * | 5/1994 | Anderson | F16D 55/36 188/73.37 |
| 6,553,762 | B2 * | 4/2003 | Loffler | F01D 9/026 415/203 |
| 7,074,009 | B2 * | 7/2006 | Allmang | F01D 9/026 415/177 |
| 7,371,047 | B2 * | 5/2008 | Burmester | F01D 9/026 415/204 |
| 7,987,952 | B2 * | 8/2011 | Phan | H02K 5/15 188/156 |
| 8,382,429 | B2 * | 2/2013 | Grussmann | F01D 11/005 415/213.1 |
| 8,528,328 | B2 * | 9/2013 | Stroph | F01D 25/26 60/605.1 |
| 8,628,296 | B2 * | 1/2014 | Grussmann | F02C 7/12 415/204 |
| 8,667,679 | B2 * | 3/2014 | Smatloch | B23P 15/00 29/889.2 |
| 8,726,655 | B2 * | 5/2014 | Smatloch | F01D 25/243 60/602 |
| 8,951,007 | B2 * | 2/2015 | Botsch | F01D 25/246 415/158 |
| 9,200,567 | B2 * | 12/2015 | Parker | F01D 21/045 |
| 9,261,109 | B2 * | 2/2016 | Maeda | F04D 29/40 |
| 9,447,698 | B2 * | 9/2016 | Grussmann | F02C 6/12 |
| 9,581,045 | B2 * | 2/2017 | Nagae | F01D 25/24 |
| 9,719,374 | B2 * | 8/2017 | Maeda | F01D 25/24 |
| 10,001,137 | B2 * | 6/2018 | Krewinkel | F04D 17/10 |
| 10,094,243 | B2 * | 10/2018 | Grussmann | F01D 25/26 |
| 10,145,267 | B2 * | 12/2018 | Yokoyama | F01D 25/26 |
| 10,240,485 | B2 * | 3/2019 | Grussmann | F02B 37/02 |
| 10,458,281 | B2 * | 10/2019 | Tripodina | F01D 25/04 |
| 10,519,808 | B2 * | 12/2019 | Hossbach | F01D 17/165 |
| 10,570,779 | B2 * | 2/2020 | Hara | F01D 25/24 |
| 10,605,118 | B2 * | 3/2020 | Hoßbach | F02B 39/005 |
| 2008/0295516 | A1 * | 12/2008 | Teshima | F01D 25/243 60/624 |
| 2010/0313554 | A1 * | 12/2010 | Abram | F01N 1/165 60/324 |
| 2010/0316494 | A1 * | 12/2010 | Gru mann | F01D 25/26 415/231 |
| 2011/0286837 | A1 * | 11/2011 | Smatloch | F02C 6/12 415/170.1 |
| 2013/0064482 | A1 * | 3/2013 | Jaehrling | E05D 11/00 384/7 |
| 2013/0071203 | A1 * | 3/2013 | Hay | F16B 5/0258 411/111 |
| 2015/0322850 | A1 * | 11/2015 | Vardhana | F01D 15/02 415/177 |
| 2018/0016942 | A1 * | 1/2018 | Sakamoto | F01D 25/26 |
| 2018/0058404 | A1 * | 3/2018 | Tibbs | F02M 55/04 |
| 2018/0094667 | A1 * | 4/2018 | Clark | F16B 21/06 |
| 2018/0209298 | A1 * | 7/2018 | Binsberger | F16B 43/001 |
| 2018/0237891 | A1 * | 8/2018 | Hori | C22C 38/46 |
| 2018/0355762 | A1 * | 12/2018 | Tripodina | F01D 25/24 |
| 2019/0072002 | A1 * | 3/2019 | Bartholoma | F02C 6/12 |
| 2019/0136717 | A1 * | 5/2019 | Sato | F02C 6/12 |

* cited by examiner

TURBOCHARGER

BACKGROUND OF THE INVENTION

1. Field of the Invention

The invention relates to a casing of a turbocharger and to a turbocharger.

2. Description of the Related Art

The fundamental construction of a turbocharger is known to the person addressed here. A turbocharger comprises a turbine in which a first medium is expanded and a compressor in which a second medium is compressed utilising energy extracted in the turbine during the expansion of the first medium. The turbine of the turbocharger comprises a turbine housing and a turbine rotor. The compressor of the turbocharger comprises a compressor housing and a compressor rotor. Between the turbine housing of the turbine and the compressor housing of the compressor a bearing housing is positioned, wherein the bearing housing is connected on the one hand to the turbine housing and on the other hand to the compressor housing. In the bearing housing, a shaft is mounted via which the turbine rotor is coupled to the compressor rotor.

During the operation of a turbocharger there is the danger that the turbine rotor or the compressor rotor of the turbocharger breaks and fragments of the rotor strike through the relevant housing, i.e. the turbine housing or the compressor housing. There is then the danger that the fragments of the turbocharger enter the surroundings. In order to take into account this problem of the bursting of a rotor of the turbocharger, the respective housing in the case of turbochargers known from practice is designed in such a manner that a failure of the respective housing need not be expected and even upon the breakage of the respective rotor, fragments of the same cannot strike through the respective housing. However, the weight of the turbocharger is increased because of this.

So as to not unnecessarily increase the weight of the turbocharger and additionally also protect turbochargers already employed in the field from fragments of a rotor striking through into the surroundings it is already known from practice to equip a turbocharger with a casing, which radially outside as well as axially outside surrounds a turbine housing and/or a compressor housing and/or a bearing housing of the turbocharger at least in sections.

Such casings not only serve for providing a burst protection. Such casings can also serve for thermally insulating assemblies of the turbocharger.

A casing of a turbocharger is connected to the housing of the turbocharger to be encased, preferentially by way of multiple fastening devices, which extend through the casing into the housing to be encased. The housing of a turbocharger is subject to cyclical thermal loads which result in that the housing to be encased is heated up during the operation, expands as a consequence of the heating, cools down and as a consequence of the cooling contracts. As a consequence of such cyclical thermal loads of the housing to be encased, forces act on the casing of the same which can result in that the connection of the casing with the housing to be encased fails or the housing to be encased and the casing are damaged.

SUMMARY OF THE INVENTION

There is a need for improving the connection between a housing of the turbocharger to be encased and a casing surrounding the same at least in sections. Starting out from this, one aspect of the invention is based on the object of creating a new type of turbocharger.

According to one aspect of the invention at least some of the fastening devices of the casing, which extend through a respective wall of the casing into the housing to be encased, comprise metallic damping elements made of wire on sides of the respective wall located opposite one another through which the same extend. In the case of the turbocharger according to the invention, the metallic damping elements of the respective fastening device allow a compensation of the geometrical deformation of the housing brought about by a cyclical thermal loading of the housing to be encased. Forces, which as a consequence of a cyclical thermal loading, emanating from the housing to be encased are introduced into the casing can be drastically reduced in this way. The danger that the fastening devices fail is thus reduced. The danger that the housing to be encased and/or the casing are damaged is likewise reduced. A further advantage of the damping elements is that they also dampen vibrations and thus reduce dynamic forces.

Preferentially, the metallic damping elements made of wire of the respective fastening device are positioned between covering elements. Fastening screws preferentially extend through the respective covering elements and the respective damping elements positioned between the covering elements. Forces that are a consequence of cyclical thermal loading or dynamic vibrations emanating from the housing to be encased are introduced into the casing can thus be particularly advantageously reduced.

Preferentially, the metallic damping elements, which are made of wire, are formed as wire pads. Damping elements formed as wire pads allow a particularly advantageous compensation of vibrations and deformations of the housing to be encased caused by the latter being exposed to cyclical thermal loads. By way of this, the force introduction into the casing or into the fastening devices, by way of which the casing is connected to the housing to be encased, can be reduced in a particularly advantageous manner.

Preferentially, the metallic damping elements made of wire are produced from a high-temperature resistant steel. In particular, when the metallic damping elements are produced from a high-temperature resistant steel, the same are particularly suited for withstanding thermal loads on the turbocharger.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a turbocharger.

The fundamental construction of a turbocharger is familiar to the person skilled in the art addressed here. Accordingly, the turbocharger comprises a turbine for expanding a first medium, in particular for expanding exhaust gas, and a compressor for compressing a second medium, in particular for compressing charge air, namely utilising the energy extracted in the turbine during the expansion of the first medium.

The turbine comprises a turbine rotor and a turbine housing. The compressor comprises a compressor rotor and a compressor housing. The turbine rotor and the compressor rotor are coupled via a shaft which is mounted in a bearing housing of the turbocharger, wherein the bearing housing is connected both to the turbine housing and also to the compressor housing.

In particular when during the operation for example the turbine rotor or the compressor rotor breaks, fragments of the same can strike through the respective housing, i.e. the turbine housing or the compressor housing and enter the surroundings. This has to be avoided for the purpose of which it is known to equip a turbocharger with a casing which surrounds the turbine housing and/or the compressor housing and/or the bearing housing of the turbocharger.

Preferentially, a separate casing each is employed in the region of the turbine housing and of the compressor housing which surrounds the respective casing of the turbocharger to be encased radially outside and axially outside at least in sections.

Such casings not only serve for providing a burst protection. Such casings can also serve for thermally insulating and sound proofing assemblies of the turbocharger.

Figure 1:
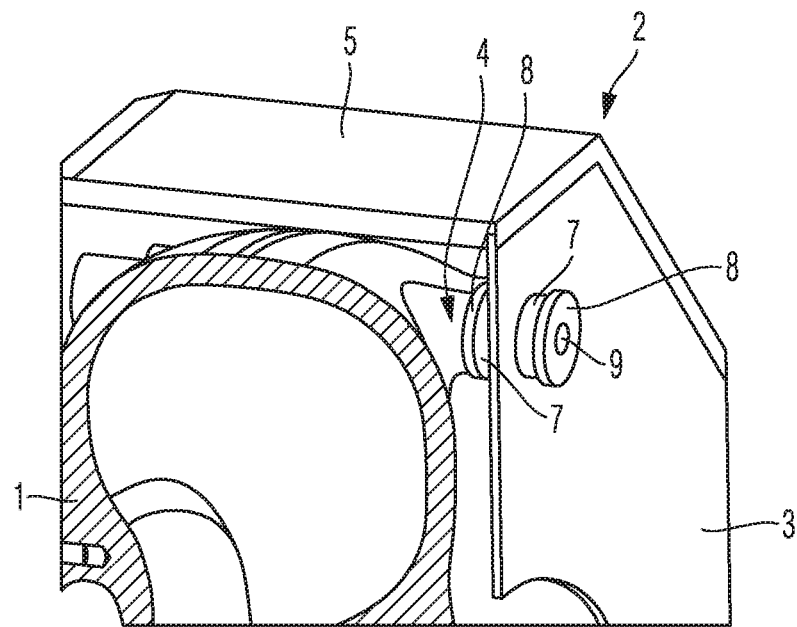
FIG. 1 is a schematized perspective cross section through a turbocharger in a region of a housing of the turbocharger and of a casing of the housing.
Figure 2:
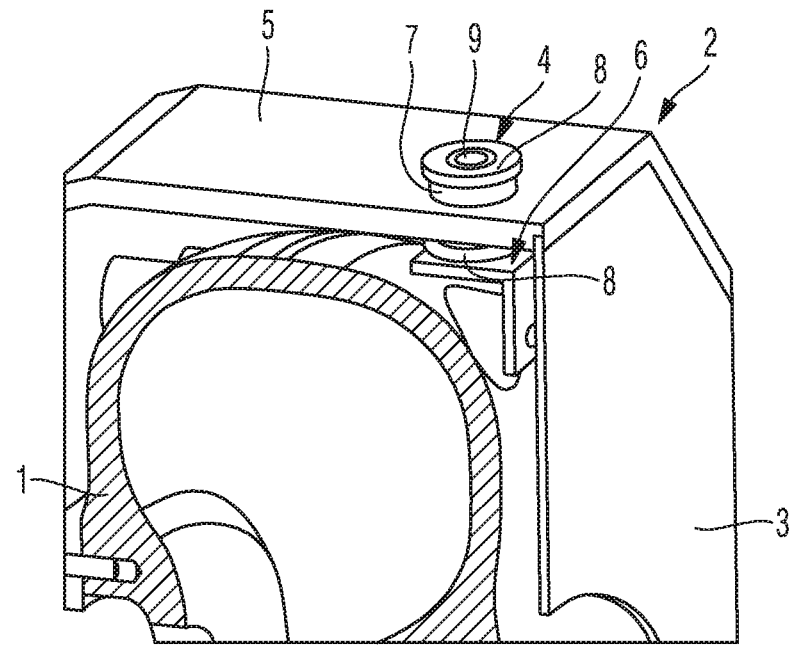
FIG. 2 is a schematized perspective cross section through a turbocharger in a region of a housing of the turbocharger and of a casing of the housing.

FIGS. 1, 2 each show a schematized perspective cross section by way of an extract through a turbocharger in the region of a turbine housing 1 and of a casing 2 surrounding the turbine housing 1 on the outside at least in sections. The concrete construction of the casing 2 is of no significance to the present invention.

In FIG. 1, the casing 2 on an axial wall 3 of the casing 2 is directly connected to the turbine housing 1 to be encased via a fastening device 4.

By contrast, FIG. 2 shows a version in which the casing 2 is connected on a radial wall 5 to the housing 1 of the turbocharger to be encased, namely again via a fastening device 4, however not directly as in FIG. 1, but indirectly via a bracket 6, which is connected to the turbine housing 1 to be encased.

It is pointed out that obviously the casing 2 is connected to the turbine housing 1 to be encased via multiple fastening devices 4, wherein the fastening devices 4 can act both an axial wall 3 or on a radial wall 5 of the casing 2.

At least some of the fastening devices 4, which extend through a respective wall 3 or 5 of the casing 2 into the housing 1 to be encased have metallic damping elements 7 made of wire on sides located opposite one another of the respective wall 3 or 5 of the casing 2. Preferentially, covering elements 8 adjoin the damping elements 7 on the outside. The metallic damping elements 7 of the fastening devices 4 are then positioned sandwich-like between covering elements 8.

Fastening screws 9 extend through the covering elements 8 and through the metallic damping elements 7 made of wire, namely into the housing 1 to be encased. In FIGS. 1 and 2, screw heads of the fastening screws 9 are countersunk flush in that covering element 8, which is accessible from the outside, i.e. from outside the casing 2.

The metallic damping elements 7 made of wire which adjoin on both sides of that wall 3 or 5 of the casing through which the respective fastening device 4 extends, are preferentially wire pads. Such a wire pad can be a pad of multiple layers of a wire fabric or wire mesh or knitted wire fabric, which are preferentially connected to one another. The wire pad can also be formed in the manner of a ball.

In each case, the metallic damping element 7 is made of wire, which is preferentially embodied as a wire pad, is elastically or resiliently deformable. Through this elastic deformability, forces which during the operation of the turbocharger act on the fastening devices 4 can be minimised. The wires or wire sections of the wire pads, brought about by their rubbing against one another, make available a high level of damping. Vibrations on the casing caused by the operation can also be reduced.

The metallic damping elements 7 made of wire allow a relative movement between the housing 1 to be encased and the casing 2, in particular such relative movements as are brought about by a cyclical thermal loading of the housing 1 to be encased.

Here, the metallic damping elements 7 made of wire are preferentially produced from a high-temperature resistant steel.

The covering elements 8 are preferentially formed disc-like, dish-like, or plate-like, wherein in the mounted state between two covering elements 8 of a fastening device 4 on the one side a wall 3 or 5 of the casing 1 and on each side of the wall 3 or 5 a metallic damping element 7 made of wire is arranged.

Figure 3:
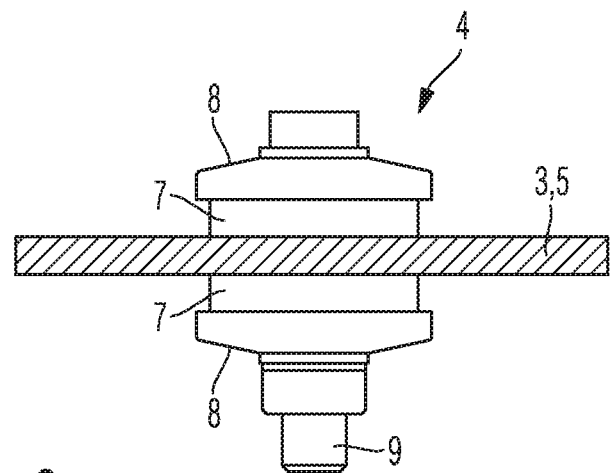
FIG. 3 is a fastening device of a turbocharger according to the invention together with a wall of a casing.
Figure 4:
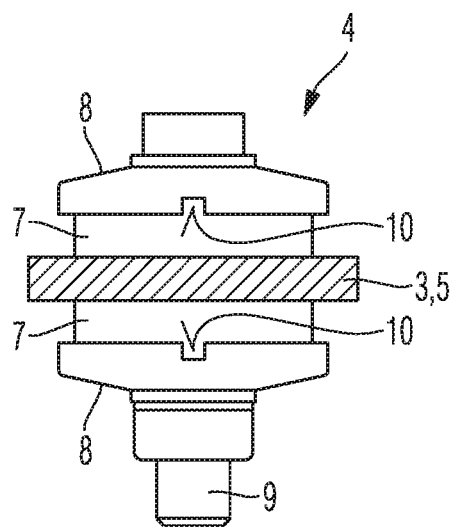
FIG. 4 is the arrangement of FIG. 3 rotated by 90°.

FIGS. 3 and 4 show a fastening device 4 in greater detail, namely together with a wall 3 or 5, through which the fastening device 4 extends. Accordingly, FIG. 4 shows the actual fastening screw 9, which extends through the respective wall 3 or 5 and projects into the casing 1 to be encased, which is not shown in FIGS. 3 to 4. On both sides of the wall 3, 5 of the casing 2 a metallic damping element 7 made of wire is arranged, wherein the metallic damping elements 7 are positioned between covering elements 8.

According to FIG. 4, each of the covering elements 8 comprises a slot-like or groove-like recess 10 in at least one circumferential position. In particular when the screw 9 is tightened, a defined force introduction and thus deformation of the metallic damping elements 7 can be ensured through such a recess 10.

In FIGS. 3 and 4, screw heads of the fastening screws 9 are supported at the top on one of the covering elements 8. Accordingly, the same are not countersunk into one of the covering elements 8 in FIGS. 3 and 4 as shown in FIGS. 1 and 2.

With the invention, thermal deformations and vibrations of the housing 1 to be encased and a relative movement caused by this between the housing 1 to be encased and the casing can be compensated in order to thereby reduce a force introduction into the casing 2 and into the fastening devices 4, via which the casing 2 is connected to the housing 1 to be encased.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A turbocharger, comprising:
   a turbine for expanding a first medium;
   a turbine housing of the turbine;
   a compressor for compressing a second medium utilising energy extracted in the turbine during expansion of the first medium;
   a compressor housing of the compressor;
   a bearing housing arranged between and connected to the turbine housing and the compressor housing;
   a casing that radially and axially surrounds at least in sections one or more of the turbine housing, the compressor housing, and the bearing housing;
   multiple fasteners configured to connect the casing to the respective housing to be surrounded by extending through a respective wall of the casing into the housing to be encased; and
   metallic damping elements made of wire, the metallic damping elements arranged directly on opposite sides of the respective wall of the casing and through which at least one of the multiple fasteners extends, the metallic damping elements each having a respective axially extending inner surface that directly faces the at least one of the multiple fasteners that extends through the metallic damping elements.

2. The turbocharger according to claim 1, wherein the metallic damping elements are formed as wire cushions.

3. The turbocharger according to claim 2, wherein the wire cushions comprise multiple layers of a wire fabric, a wire mesh, or a knitted wire fabric.

4. The turbocharger according to claim 3, wherein the multiple layers are connected to one another.

5. The turbocharger according to claim 2, wherein the wire cushions comprise at least one layer of a wire fabric, a wire mesh, or a knitted wire fabric.

6. The turbocharger according to claim 1, wherein the metallic damping elements are produced from a high-temperature resistant steel.

7. The turbocharger according to claim 1, wherein the metallic damping elements are each positioned between a respective covering element of the at least one of the multiple fasteners and the respective wall of the casing.

8. The turbocharger according to claim 7, wherein on each side of the respective wall of the casing, through which the at least fastener extends, a respective metallic damping element and the respective covering element are positioned, wherein the respective damping elements and the respective wall are arranged between the respective covering elements.

9. The turbocharger according to claim 7, wherein the covering elements are disc-shaped, dish-shaped, or plate-shaped.

10. The turbocharger according to claim 7, wherein the at least one of the multiple fasteners is a fastening screw that extends through respective covering elements and respective damping elements positioned between the respective covering elements and the wall positioned between the respective damping elements.

11. The turbocharger according to claim 7, wherein at least one of the respective covering elements is arranged directly on the metallic damping element.

12. The turbocharger according to claim 7, wherein at least one of the respective covering elements comprises a recess in at least one circumferential position.

* * * * *